US006051642A

United States Patent [19]

Tkaczyk et al.

[11] Patent Number: 6,051,642

[45] **Date of Patent: *Apr. 18, 2000**

[54] SILICONE COMPOSITION WITH IMPROVED HIGH TEMPERATURE TOLERANCE

[75] Inventors: John Eric Tkaczyk, Delanson; Frederic Joseph Klug, Schenectady; Jayantha Amarasekera, Clifton Park; Chris Allen Sumpter, Scotia, all of N.Y.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/931,085

[22] Filed: Sep. 15, 1997

[51] Int. Cl.[7] ..................... C08J 5/10; C08K 3/34; C08L 83/00

[52] U.S. Cl. ..................... 524/444; 524/442; 524/443

[58] Field of Search ..................... 524/442, 443, 524/444, 445, 448, 449, 450, 451, 452

[56] References Cited

U.S. PATENT DOCUMENTS

| | | | |
|---|---|---|---|
| 3,689,618 | 9/1972 | Chadwick | 264/104 |
| 3,691,512 | 9/1972 | Exner | 339/176 M |
| 4,123,586 | 10/1978 | Betts et al. | 428/391 |
| 4,954,327 | 9/1990 | Blount | 423/338 |
| 4,957,554 | 9/1990 | Mathers et al. | 106/35 |
| 5,183,079 | 2/1993 | Blin | 138/110 |
| 5,202,186 | 4/1993 | Williamson | 428/375 |
| 5,227,586 | 7/1993 | Beauchamp | 174/122 R |
| 5,260,372 | 11/1993 | Toporcer et al. | 524/785 |
| 5,326,604 | 7/1994 | Williamson | 428/36.2 |
| 5,330,809 | 7/1994 | Williamson | 428/36.2 |
| 5,369,161 | 11/1994 | Kunieda et al. | 524/266 |
| 5,612,399 | 3/1997 | Beckley et al. | 524/261 |
| 5,741,616 | 4/1998 | Hirano et al. | 430/101 |

FOREIGN PATENT DOCUMENTS

| | | |
|---|---|---|
| 60-36527 | 2/1985 | Japan . |
| 62-240338 | 10/1987 | Japan . |
| 4242009 | 8/1992 | Japan . |
| 845342 | 2/1996 | Japan . |

OTHER PUBLICATIONS

"Development of Cable Systems With Improved Fire Performance Characteristics", by T.L. Journeaux, Pirelli Cables (UK), Jul. 1993.

"Performance Requirements for Cables Required to Maintain Circuit Integrity Under Fire Conditions", BSI Standards, London, 1994.

*Primary Examiner*—James J. Seidleck
*Assistant Examiner*—U. K. Rajguru
*Attorney, Agent, or Firm*—Ernest G. Cusick; Noreen C. Johnson

[57] ABSTRACT

A high temperature insulating composite composition comprising at least one ground silicate mineral and at least one silicone polymer. The at least one ground silicate mineral is at least one mineral selected from the group of olivine group; garnet group; aluminosilicates; ring silicates; chain silicates; and sheet silicates. The high temperature insulating material has particular usefulness for insulating electrical wires.

10 Claims, 2 Drawing Sheets

SILICONE COMPOSITION WITH IMPROVED HIGH TEMPERATURE TOLERANCE

FIELD OF THE INVENTION

The invention is related to silicone compositions. In particular, the invention is related to silicone compositions with additions for improving high temperature tolerance of the silicone compositions with respect to a use as an insulation, such as for electrical wire and cable.

BACKGROUND OF THE INVENTION

Fire is a complex and emotive entity. The consequences of fire are often catastrophic and disastrous. Fire destroys many seemingly indestructible objects and materials. Fire burns wood to ash, melts metals and vaporizes many other substances, often into dangerous gases. These gases are often toxic and cause severe problems, even to people trained to fight and control fires. Accordingly, it is very desirable to provide materials that are heat and fire resistant, especially in systems that enable fire fighters to carry out their jobs, for example lighting and communication systems in buildings.

Electric cables for lighting and communication systems, which are capable of operating during a fire, are becoming the standard, and often required by statute, in order to facilitate fire fighting and to limit fire propagation in buildings. Government regulations in various countries now specify that essential electrical circuits be protected in order to ensure that the electrical system be capable of operating thus assuring the safety of persons inside the building. This protection also permits firefighters to be more efficient in controlling and extinguishing fires.

Standards, such as French: NF C 32-070 ADD1 and British: BS 6387:1994, describe certification tests for electrical cables with respect to fire tolerance. These certification tests involve heating a sample of a cable, including the insulation sheath. The heating is done by an appropriate device, such as a furnace or by direct exposure to flame. During heating, the cable is energized at a rated voltage. The cable suffers a periodic mechanical shock induced, in part, by impact from a motorized arm. Failure of a cable is defined with respect to a state of fuses or breakers, which are connected in series the conductors of the cable to the power supply. The cable and wire must be able to withstand a predetermined temperature over a predetermined time in order to meet the standards.

In certain locations, such as high buildings, a minimum amount of time is needed so that all persons that may be in the building can be reached. Therefore, the electrical system during a fire must be maintained at least during that amount of time. It has been established that some essential electrical circuits must be able to operate for at least two hours, and often in excess of four hours, to ensure safety of people. Such systems include, for example, alarms which are, in turn, essential in order to enable other systems to be operated, such as telephone systems, lighting systems, elevator systems, ventilation systems, fire pumps, etc.

Electrical cables and wires used in these systems should maintain integrity and have continued conductivity performance during high temperatures that are associated with fires, at least for elongated periods of time. This will permit emergency personnel to use existing electrical systems for communications, lighting and other associated applications.

Polymeric materials, such as organic plastics and silicones, have been used as electrical insulation, for example in the insulation of the cables and wires. See for example, U.S. Pat. Nos. 5,227,586 to Beauchamp, U.S. Pat. No. 5,369,161 to Kumieda et al., 5,260,373 to Toporcer et al. While these organic materials are acceptable for their general insulation properties, the nature of organic materials in areas of fire can lead to a spread of fire, emission of smoke and release of combustion products that are dangerous to humans and injurious to equipment and human health, all of which are, of course, undesirable. Further, these insulating materials may not provide for a high temperature resistance at an elongated period of time.

Electrical insulating properties of wire and cable insulation, such as insulation formed from organic material, degrades during a fire and the high temperatures associated with a fire. The degradation of the insulation may result in failure of electrical equipment and interruption of power delivery, for example, due to electrical shorts and discharges across insulation layers. In particular, maintenance of mechanical and electrical integrity of insulation in temperatures up to about 950° C. is severely degrades and impaired.

For example, many cables which are presently in use, may be capable of resisting temperatures in the neighborhood up to about 1000° C. However, the insulation integrity of the wire or cable at such high temperatures is typically limited to a period of less than about 30 minutes. The insulation often fails at high temperatures over a relatively short time period. The failure results in an electrical short or electrical discharge, and thereby disables an electric supply. This is undesirable, especially in fire environments as it may prevent operation of emergency alarms and lighting systems that will assist in the evacuation of people, rescue efforts and fire fighting efforts. High temperature resistance is limited to a period of less than about 30 minutes.

Polymeric insulation based on silicone polymers with additions of both heat stabilizers and a fumed silica filler is known. However, polymeric insulation based on silicone polymers decomposes to a lower molecular weight species at temperatures above about 650° C. after a relatively short time period. The decomposition of a polymeric insulation based on silicone polymers is accompanied by the evolution of water and silicon containing vapors, which is less damaging compared to caustic vapors produced by halide containing organic polymers, such as PVC. A non-volatile ash remains after decomposition. The non-volatile ash can be described as a porous glass or ceramic comprising silicon, oxygen and carbon. An x-ray diffraction of the pyrolyzed silicone ash in indicates a very fine grain size or amorphous structure. The electrical conductivity, thermal conductivity and mechanical properties of the polymeric material are largely determined by its microstructure and density, as well as exact ratios of silicon, oxygen and carbon remaining in the ash.

While polymeric insulation based on silicone polymers, such as silicone polymers, with additions of both heat stabilizers and a fumed silica filler provides adequate insulation properties for relatively low temperatures and for only short time periods, they are not generally acceptable for high temperatures and heat associated with fires, and especially for elongated time periods.

SUMMARY OF THE INVENTION

Accordingly, it is desirable to provide an insulating composition that avoids the above noted, and other, deficiencies of the related art.

Further, it is desirable to provide an insulating composition that comprises a silicone polymer material, such as but not limited to a silicone gum, with additions of ground silicate minerals.

Accordingly, it is desirable to provide a high temperature insulating composition comprising at least one ground silicate mineral and at least one silicone polymer gum, such as but not limited to a silicone polymer.

Therefore, it is desirable to provide a high temperature composite insulating composition comprising at least one ground silicate mineral and at least one silicone polymer material, such as but not limited to a silicone gum, where the at least one ground silicate mineral is at least one mineral selected from the group of olivine group; garnet group; aluminosilicates; ring silicates; chain silicates; and sheet silicates.

These and other aspects, advantages and salient features of the invention will become apparent from the following detailed description, which, when taken in conjunction with the annexed drawings, disclose preferred embodiments of the invention.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE PREFERRED EMBODIMENTS

Figure 1:
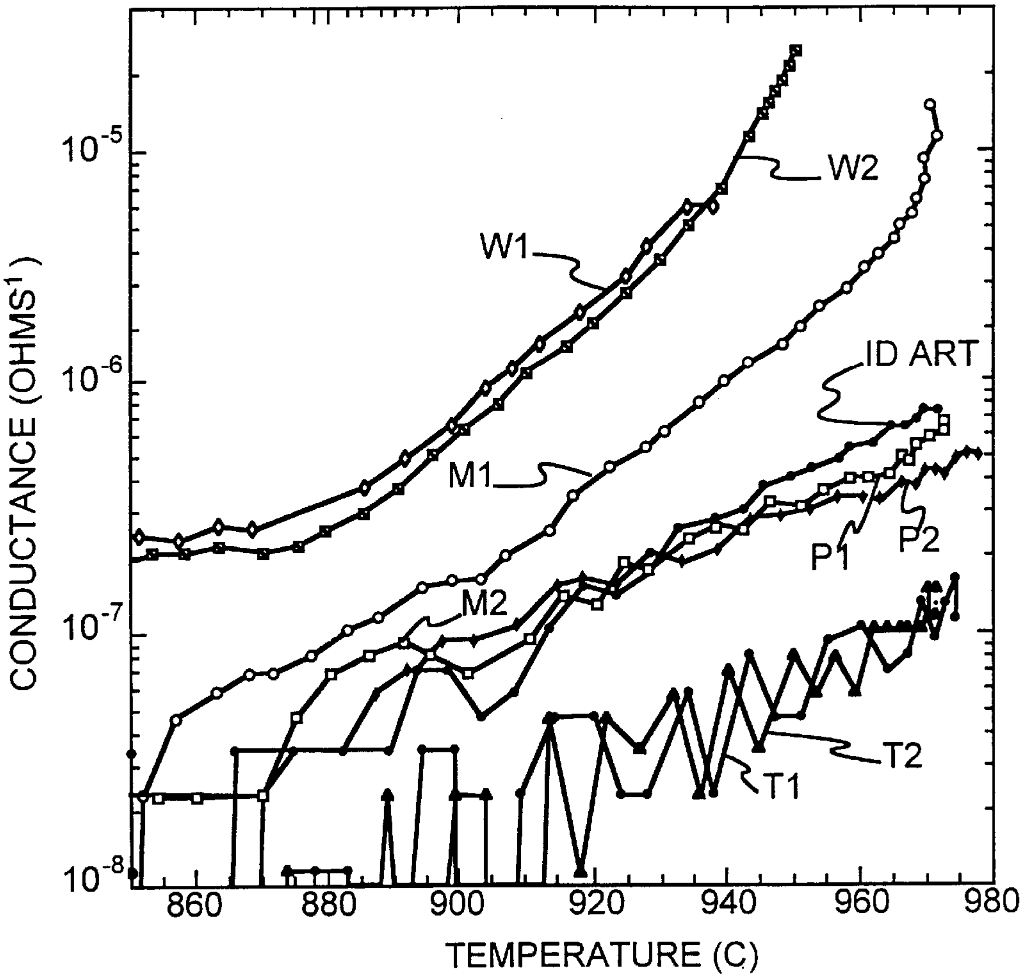
FIG. 1 is a graph of conductance versus temperature for silicone sheets filled with various silicate mineral compositions.

As embodied by the invention, it has been determined that it is desirable to decrease the high temperature electrical conductivity of composite insulation, thereby advantageously reducing heating associated with an applied electrical stress. Thus, at relatively high temperatures for extended period of time, an insulation, as embodied by the invention, will maintain a resistance to the flow of electric current. Further, it has been determined that a decreased electrical conductivity of composite insulation will advantageously maintain thermal stability at high temperatures, especially at high temperatures that are associated with fire environments.

Decreased conductivity of the composite insulation can be a consequence of at east one of intrinsic low conductivity of additives or benefits imparted as a result of an additive's interaction with silicone polymer material, such as but not limited to a silicone gum, with respect to the effects during pyrolysis. For example, an additive can reduce an amount of shrinkage in the composite structure. A structure with greater specific volume either contains increased porosity or contains an amorphous glass matrix with lower density. Decreased shrinkage in the composite insulation results in lower electrical conductivity of the composite structure.

Further, as embodied by the invention, it has been determined that an increase in thermal conductivity of insulation will advantageously prevent formation of localized hot spots in insulation. The increase in thermal conductivity of insulation to prevent formation of localized hot spots in insulation is provided by effectively removing heat from the insulation to surrounding elements and associated structures.

In insulation, especially polymeric insulation that comprises at least one silicone polymer material, such as but not limited to a silicone gum, and often a plurality of silicone polymer materials, a reinforcement effect provided by particular additives has been determined to increase strength and to maintain low conductivity at high temperatures, especially those associated with fires. The specification, for ease of discussion, hereinafter refers to silicone polymer materials, in which the silicone polymer materials include, but is not limited to, a silicone gum. Further, the reinforcement effect of particular additives, especially polymeric insulation that comprises silicone polymer material, such as but not limited to a silicone gum, as embodied by the invention, has been determined to enhance crack resistance. The enhanced crack resistance has been determined to make the insulation more tolerant to thermal and mechanical shock, which is very desirable and advantageous in maintaining the integrity and operation of electrical wires and cables (hereafter wires) in high temperature environments associated with fires.

Further, it has been determined that the addition of additives into a silicone polymer insulating composition for wires, as embodied by the invention, that thermal expansion characteristics of insulation on wires during pyrolysis will be altered by the additives. The thermal expansion characteristics of insulation during pyrolysis will be altered so as to at least one of generally approximate and approximately match thermal expansion characteristics of metal conductor in the wire.

A general approximation or match of thermal expansion characteristics of metal conductor in a wire has been determined to result in reduced transverse cracking. The traverse cracking is associated with differential expansion of metal conductive wire versus insulation in the insulated wire. Since traverse cracking is undesirable, it has been determined that traverse cracking in an insulative material should occur less frequently during pyrolysis. Further, the general approximation or match of thermal expansion characteristics of the insulation to that of a metal conductor in the wire results in transverse cracking occurring less frequently during pyrolysis along the insulted wire or insulated cable. Accordingly, it is desirable to provide a material that avoids problems associated with traverse cracking.

Further, it has been determined that an addition of additives into a silicone polymer insulating composition, as embodied by the invention, that volumetric shrinkage of insulation on wires during pyrolysis will be reduced by the additives. Reduced shrinkage results in reduced cracking. Since different regions of the composite insulation during a fire may be at different temperatures, an approximate volume independence of the insulation with temperature prevents differential contraction within the insulation and prevents the associated cracking of the insulation during a fire.

Therefore, several materials were investigated and determined to advantageously modify pyrolysis effects of silicone polymer insulation. In particular, various materials were investigated to determine the extent of modifying pyrolysis effects of silicone polymer insulation on insulated wires or insulated cables.

Various samples of composite materials comprising additions of different ground silicate minerals to silicone polymer to form an insulating composite material, as embodied by the invention, were prepared. The samples further comprised fumed silica. Fumed silica is used as a reinforcing filler to obtain at least one of, and preferably both of, good polymer-filler interaction and to obtain good physical properties. Tests of conductance versus temperature were conducted for the respective samples of composite materials comprising additions of ground silicate minerals to silicone polymers, as embodied by the invention, to illustrate beneficial low conductivity at high temperatures of the composite materials, as embodied by the invention.

FIG. 1 is a graph of conductance versus temperature for various composite materials comprising additions of ground silicate minerals to silicone polymers. The composite materials comprising additions of ground silicate minerals to silicone polymers that are tested are in the form of silicone sheets filled with silicate mineral compositions. In FIG. 1, data from two separate runs are shown for each of three samples of composite materials comprising additions of ground silicate minerals to silicone polymers, as embodied by the invention. The samples of composite materials, as embodied by the invention, illustrated in FIG. 1 include silicone sheets filled with wollastonite (curves W1 and W2), include silicone sheets filled with mica (curves M1 and M2), silicone sheets filled with pyrophyllite (curves P1 and P2), and silicone sheets filled with talc (curves T1 and T2).

In FIG. 1, the silicone sheet samples filled with talc (curves T1 and T2) and pyrophyllite (curves P1 and P2) exhibit improved combinations of electrical conductivity characteristics and behavior. As illustrated by the curves, the silicone sheet samples filled with talc and pyrophyllite possess a low conductivity at high temperatures. Further, the surface treated talc provided a lower conductivity than untreated (raw) talc. This lower conductivity is illustrated in FIG. 1, by the curves T1 and T2.

The mica and talc ground silicates were surface treated with silane coupling agents. These surface modified minerals made the compositions more compatible with composite silicone polymer compositions, as embodied by the invention. Also, the surface modified minerals improved mechanical properties of the composite silicone polymer compositions, as embodied by the invention.

Various composite silicone polymer compositions with ground silicate minerals, as embodied by the invention, were prepared to demonstrate the suitability of the compositions as insulators for wires. The samples prepared also comprised fumed silica. The composite silicone polymer compositions were prepared as cured sheets of silicone, where the sheets of cured silicone had a thickness of about 2 mm. The sheets of cured silicone comprising composite silicone polymer compositions, as embodied by the invention, were prepared having the following approximate weight ratio: 100 parts silicone polymer, 40 parts fumed silica and 40 parts of the powdered silicate mineral. Powders of the ground silicate mineral and the fumed silica were compounded into the uncured silicone resin along with a curing agent, for example a 2–4, Dichlorobenzoyl Peroxide curing agent. The composite was then pressed into sheets, which are then heated to about 275° F. for about 12 minutes to effect cross-linking and polymerization.

The sheets of cured silicone comprising composite silicone polymer compositions, as embodied by the invention, were cut into approximately ¾" disks. The electrical conductivity of the disks was measured as a function of temperature, up to a maximum of about 975° C. The conductivity data is illustrated FIG. 1, where the curve LPnat is illustrative of known insulative material, which does not comprise a silicate filler.

Measurements of sample size of the sheets of cured silicone comprising composite silicone polymer compositions, as embodied by the invention, before and after the tests were taken. The measurement data indicates that the known insulative material (curve LPnat) shrinks about 6%, due at least in part to sintering at high temperatures. In contrast, there was little if any no shrinkage for silicate filled materials, as embodied by the invention.

Further, in some dimensions, for sheets of cured silicone comprising composite silicone polymer compositions containing pyrophyllite and mica, as embodied by the invention, it was determined that there was an increase in size for these materials. This size expansion is believed to be a result of gas evolution during pyrolysis. Also, size expansion is believed to be a natural consequence of expansion of pyrophyllite and mica upon decomposition.

An inspection after pyrolysis of the sheets of cured silicone comprising composite silicone polymer compositions, as embodied by the invention, indicated that substantially all of the silicate filled material, as embodied by the invention, had improved mechanical properties, especially when compared to standard LP material (curve LPnat). The sheets of cured silicone comprising composite silicone polymer compositions, as embodied by the invention, exhibited little, and in some instances, even no cracking or crack-related discharge events.

In contrast, the known LP material (curve LPnat) showed cracking upon inspection. Further, electrical breakdown at relatively low temperatures was common for the LP material. However, the silicate filled material sheets of cured silicone comprising composite silicone polymer compositions, as embodied by the invention, rarely failed. If the silicate filled material sheets of cured silicone comprising composite silicone polymer compositions, as embodied by the invention, exhibited any failure evident, the failure is believed to be caused by thermal instability.

As indicated in FIG. 1, both the wollastonite and mica, as fillers in a silicone polymer composite material, result in conductivity that is substantially higher than standard LP material. For wollastonite and mica as fillers composite materials, electrical breakdown due to thermal instability was enhanced. As a result, it has been determined that the use of these two fillers should be restricted to applications where temperatures do not exceed about 800° C. However, it has also been determined the use of wollastonite and mica as composite materials fillers provides increased mechanical strength and enhanced thermal expansions.

The silicone polymer composite material with a filler of pyrophyllite provided approximately a similar conductivity as the standard LP material. However, the silicone polymer composite material with a filler of pyrophyllite exhibited far superior mechanical properties.

For a talc filled silicone polymer composite material a lower conductivity was exhibited at higher temperatures. Therefore, a talc filled silicone polymer composite material was determined to be a very resistant to electrical breakdown material in a silicone polymer composite material, as embodied by the invention.

Therefore, it has been determined that appropriate additives, such as ground silicate minerals added to silicone polymers, as embodied by the invention, in an insulation for wires and associated systems, thereby allows successful operation during a high temperature event, such as a fire. The successful operation occurs over an enhanced period of time, especially when compared to known materials, including those with a thinner insulation thickness.

As embodied by the invention, the ground silicate minerals that are added to silicone polymer, are added in as ground powders constituents. The ground powders constituents are homogeneously mixed into an uncured silicone polymer composition. Further, conventional and well-known fillers and heat stabilizing additives may also be added to the silicone polymer composition comprising the ground silicate minerals. The resulting composite composition is then provided onto wires, such as by coating, coextrusion or other well-known application processes, as insulation, for cable applications. The coating process includes conventional manufacturing and coating processes.

The ratio of the ground silicate minerals to silicone polymer is limited by a trade off between low temperature and high temperature properties of the composite. For example, the low temperature viscosity of an uncured composite increases with an increased silicate mineral content, which above a certain level is undesirable for the manufacturing of wire and cable. The ratio is adjusted to provide an acceptable viscosity for wire and cable manufacture, but is still sufficient to provide high electrical resistance and desirable mechanical characteristics at high temperatures. As embodied by the invention, it has been determined that a desired ratio of the ground silicate minerals to silicone polymer is in a range between about 5% to about 40% by weight. Further, it has been determined that a desired ratio of the ground silicate minerals to silicone polymer is in a range between about 15% to about 20% by weight is further preferable. Compositions, as embodied by the invention, with as little as about 5% by weight of a silicate mineral are believed to provide desirable high temperature insulating properties. Also, it has been determined that compositions, as embodied by the invention, with greater than about 40% by weight of silicate minerals are less easy to manufacture that lower weight percentage compositions due, at least in part to high viscosity of the composition.

The ground silicate minerals, as embodied by the invention, are added in the form of ground powders and comprise at least one mineral that is formed by a coordination of $SiO_4$ tetrahedra. The coordination of $SiO_4$ tetrahedra is often associated with minerals, such as but not limited to, aluminum, magnesium, calcium and iron. Accordingly, the ground silicate minerals, as embodied by the invention, comprise at least one ground silicate mineral from the group consisting of olivine group; garnet group; aluminosilicates; ring silicates; chain silicates; and sheet silicates.

The olivine group comprises ground silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_32SiO_2$; kyanite; and $Al_2SiO_5$.

The ring silicates group comprises ground silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises ground silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; vermiculite; and $Mg,Ca)_{0.7}(Mg,Fe,Al)_6[(Al,Si)_8O_{20}](OH)_4\ 8H_2O$.

Natural sources for these ground silicate minerals are generally found in an essentially impure state. It has been determined that, in particular, alkali metals such as but not limited to potassium and sodium, if found as an impurity in ground silicate minerals, impart a significant high temperature conductivity to a composite silicone polymer composition comprising the ground silicate minerals. Accordingly, the alkali metals are detrimental to performance of the composite silicone polymer composition comprising the ground silicate minerals as an insulation.

Therefore, ground silicate minerals as additives for a composite silicone polymer composition, as embodied by the invention, that contain these alkali metal impurities should be avoided. If ground silicate minerals are determined to contain the alkali metals, the alkali metals should be removed from the ground silicate minerals, if possible, prior to the incorporation into a composite silicone polymer composition comprising the ground silicate minerals.

In addition, a surface treatment of the ground silicate minerals may be performed, for example with silane coupling agents, in order to reduce adsorbed water. The surface treatment of ground silicate minerals also makes the ground silicate minerals easily wetted by the silicone polymer. These surface modified minerals do not clump, and can be homogeneously incorporated into the silicone polymer. This results in improved room temperature mechanical properties of the uncured composite. Furthermore, the surface treated minerals give a lower conductivity than untreated or raw material.

In addition, a variety of secondary additives are commonly used to modify the low temperature mechanical strength, viscosity and aging properties of silicone based insulation systems. These additives should not be detrimental to the high temperature properties described above. They should not impart an increased electrical conductivity at high temperature to the insulation nor should they result in shrinkage of the composite material.

Figure 2:
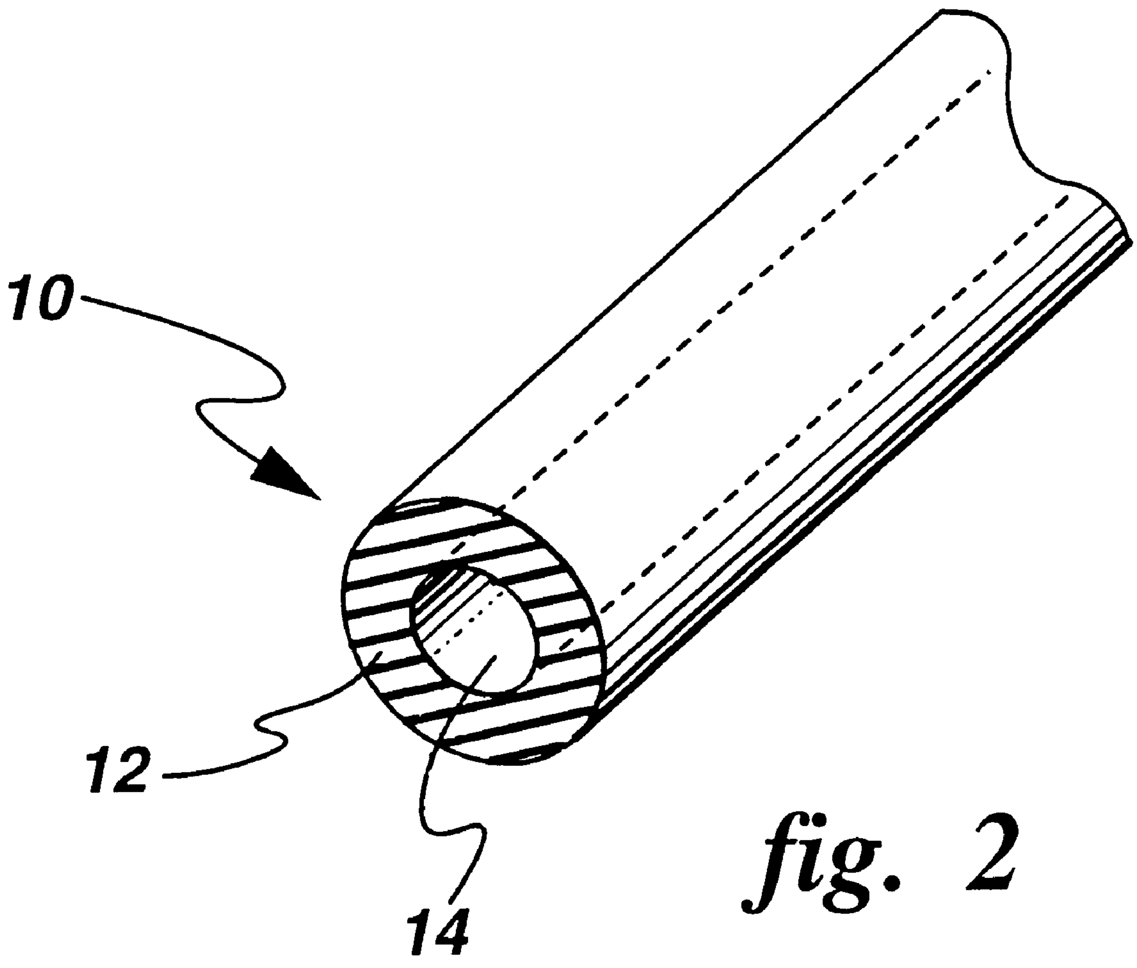
FIG. 2 is a sectional view of an electrical conductor with an insulation formed as embodied by the invention.

FIG. 2 is an illustration of a section of an electrical conductor 10 with an insulation formed from a composition, as embodied by the invention. The conductor 10 comprises an insulation 12 and conductive means 14. The insulation 12 is formed from a composition, as embodied by the invention, and described above. The conductive means 14 is a structure capable of carrying a current. The conductive means 14 comprises at least one of a wire, cable, or other conductive structure. The conductive means 14 can be formed from any conductive composition, such as but not limited to metals, alloys, ceramics, semiconductors, strands of wires and cables and combinations of these structures. The insulation is placed on the conductive means by an appropriate manner, for example but not limited to extrusion. The exact configuration and constituents of the conductive means 14 are not material to the electrical conductor 10 with an insulation formed from a composition, as embodied by the invention.

While the embodiments described herein are preferred, it will be appreciated from the specification that various combinations of elements, variations or improvements therein may be made by those skilled in the art that are within the scope of the invention.

We claim:

1. An insulating composition that insulates at high temperatures, the composition comprising a silicone polymer composite, the silicone polymer composite consisting essentially of:

at least one ground silicate mineral, the at least one ground silicate mineral comprising pyrophyllite; and a silicone polymer.

2. The composition according to claim 1, wherein a ratio of the at least one ground silicate mineral to the silicone polymer is about 20% by weight.

3. The composition according to claim 1, the composition further comprising at least one of fillers and heat stabilizing additives.

4. The composition according to claim 1, wherein the at least one ground silicone mineral is substantially powder and homogeneously mixed into the at least one silicone polymer.

5. The composition according to claim 1, wherein the at least one ground silicone mineral comprises at least one mineral that is formed by a coordination of $SiO_4$ tetrahedra, the at least one mineral formed by a coordination of $SiO_4$ tetrahedra comprising at least one mineral selected from the group consisting of: aluminum, magnesium, calcium and iron.

6. The composition according to claim 1, wherein the composition is fire resistant, and when placed on an electrical conductor, provides fire and high temperature insulation to the electrical conductor.

7. An insulating composition that insulates at high temperatures, the composition comprising a silicone polymer composite, the silicone polymer composite consisting of:

at least one ground silicate mineral, the at least one ground silicate mineral comprising pyrophyllite; and at least one silicone polymer.

8. The composition according to claim 7, the composition further comprising at least one of fillers and heat stabilizing additives.

9. The composition according to claim 7, wherein the at least one ground silicone mineral is substantially powder and homogeneously mixed into the at least one silicone polymer.

10. The composition according to claim 7, wherein the composition is fire resistant, and when placed on an electrical conductor, provides fire and high temperature insulation to the electrical conductor.

* * * * *